March 13, 1951     B. W. MACH     2,544,846
COOKING UTENSIL
Filed Jan. 11, 1949

INVENTOR.
Benjamin W. Mach
BY Theodore W. Miller
Attorney

UNITED STATES PATENT OFFICE 2,544,846

COOKING UTENSIL

Benjamin W. Mach, Chicago, Ill.

Application January 11, 1949, Serial No. 70,196

3 Claims. (Cl. 99—355)

This invention relates to adjustably movable inner bottoms for frying pans for draining the grease from fried foods, for example bacon, and maintaining the same warm by leaving it in the pan out of contact with the grease so as to avoid reabsorption of the latter by the food.

In frying certain foods, for example bacon, when the cooking process has been completed and the bacon is not consumed immediately it is desirable to keep it warm but if it is left in the pan for that purpose until consumed it will reabsorb the grease.

Accordingly the primary object of this invention is to provide a means for supporting fried food within the frying pan but out of contact with the grease or other substance which has been expelled from it in the process of frying or in which it has been fried so that it may be kept warm without absorbing or reabsorbing such substance.

Another object of this invention is to provide such a means which is simple of construction and economical of manufacture and which may be conveniently used.

Other and further objects of this invention will become more apparent hereinafter as the same becomes better understood from an examination of the specification and claims in conjunction with the accompanying drawings wherein:

Figure 1:
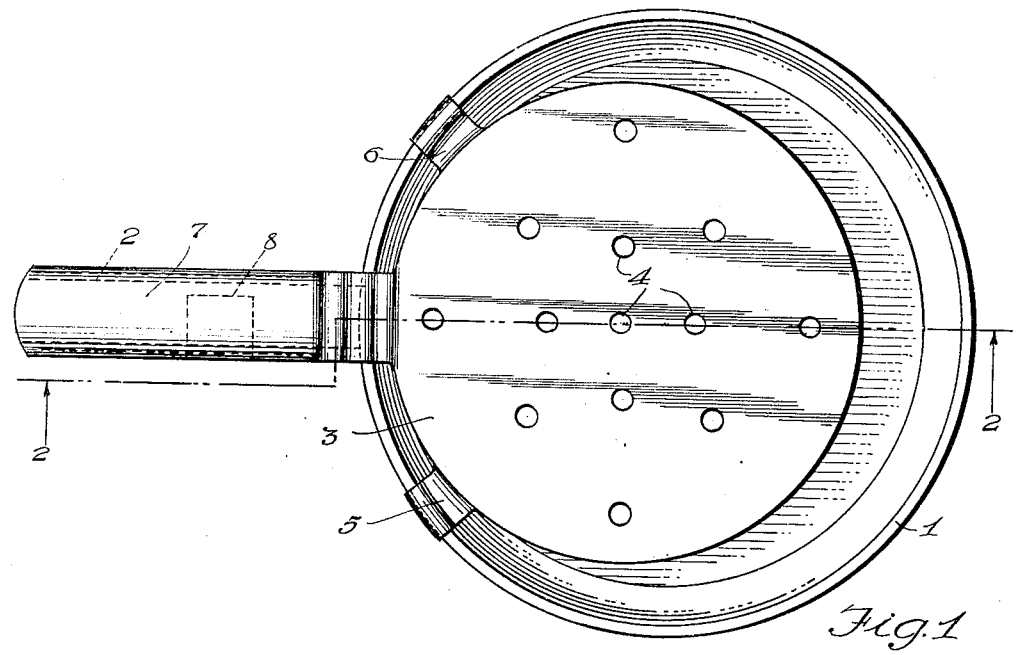
Fig. 1 is a plan view of a frying pan having an adjustably movable inner bottom or support embodying this invention.

Referring to the drawings more particularly reference character 1 designates a frying pan having a handle 2.

Figure 2:
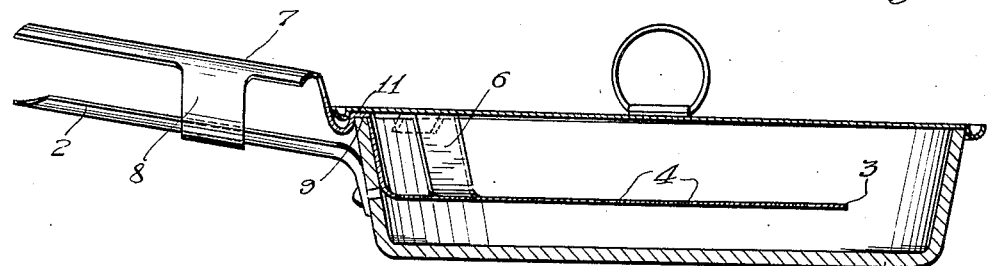
Fig. 2 is a section taken at the line 2—2 of Fig. 1.
Figure 3:
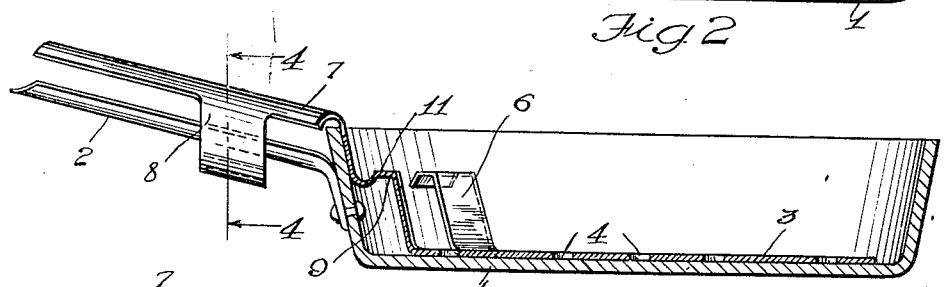
Fig. 3 is a section with the inner bottom or support in frying or inoperative position.
Figure 4:
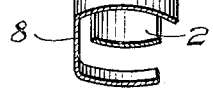
Fig. 4 is an enlarged detail section taken at the line 4—4 of Fig. 3.

Within the pan 1 is a circular sheet metal inner bottom or support 3 having perforations 4. The support 3 has a pair of angularly spaced integral radially extending lugs or hooks 5 and 6 which extend upwardly and over the edge of the pan 1 to rest thereon when the support is in operative position as shown in Fig. 2. The support 3 is also provided with an integral handle 7, the latter having a depending integral hook portion or member 8 which is adapted to engage the underside of the handle 2 when the support 3 is in operative position to hold the same against tilting downwardly. The connection between the handle 7 and the circular support or inner bottom 3 is formed integrally therewith and is shaped to permit a cover 10 to enclose both the pan 1 and support and to provide opposing shoulders 9 and 11 which contact the edge of the pan when the support is in operative position and the said cover respectively.

In the use of the afore-described device, the food, for example bacon, is fried with the circular support 3 on the bottom of the pan 1, said food resting on top of said support. When the bacon is fried the handle 7 is manipulated to raise the inner bottom or support 3 to cause the hooks 5 and 6 and the shoulder 7 to rest on the top edge of the pan 1 and the hook 8 to engage the underside of handle 2 to support the bacon out of contact with the grease in the pan but where it will be kept warm. The cover 10 may be placed over the pan with the bacon in raised position therein to further assist in keeping it warm. The perforations 4 facilitate draining the grease from the bacon on the support 3.

I am aware that many changes may be made and details varied without departing from the principles of my invention and I therefore do not wish to be limited to the details shown or described.

I claim:

1. The combination with a frying pan having a raised edge and a handle, and an annular perforated sheet metal inner bottom approximately co-extensive with the bottom of the frying pan and parallel therewith so that in frying position said bottoms are in contact over the entire area of the inner bottom, a handle therefor, said inner bottom provided with extensions adapted to engage said edge at one side of the center of gravity of said inner bottom to suspend the latter from said edge, said second handle being provided with an extension adapted to engage the pan handle to prevent tilting of the inner bottom about the point of contact of said first extensions and said edge.

2. The combination with a frying pan having a raised edge and a handle, and an annular perforated sheet metal inner bottom approximately co-extensive with the bottom of the frying pan and parallel therewith so that in frying position said bottoms are in contact over the entire area of the inner bottom, a handle therefor, said inner bottom provided with extensions adapted to engage said edge at one side of the center of gravity of said inner bottom to suspend the latter from said edge, said second handle being provided with an extension adapted to engage the pan handle to prevent tilting of the inner bottom about the point of contact of said first extensions and said edge and a cover adapted to enclose said pan and inner bottom when the latter is in suspended position.

3. The combination with a frying pan having a raised edge and a handle, and an annular perforated sheet metal inner bottom approximately co-extensive with the bottom of the frying pan and parallel therewith so that in frying position said bottoms are in contact over the entire area of the inner bottom, a handle therefor, said inner bottom provided with extensions adapted to engage said edge at one side of the center of gravity of said inner bottom to suspend the latter from said edge, said second handle being provided with an extension adapted to engage the pan handle to prevent tilting of the inner bottom about the point of contact of said first extensions and said edge, said inner bottom, handle therefor and all three extensions being struck from a single sheet of metal.

BENJAMIN W. MACH.

REFERENCES CITED

The following references are of record in the file of this patent:

UNITED STATES PATENTS

| Number | Name | Date |
|---|---|---|
| 769,119 | Strickland | Aug. 30, 1904 |
| 1,233,909 | Richardson | July 17, 1917 |
| 1,906,999 | Parker | May 2, 1933 |
| 1,963,294 | Davis | June 19, 1934 |
| 2,332,117 | Shepherd | Oct. 19, 1943 |

FOREIGN PATENTS

| Number | Country | Date |
|---|---|---|
| 22,760 | Great Britain | 1914 |